INVENTOR.
IVAR T. WEDIN.
BY
Robert A. Sloman
ATTORNEY.

July 22, 1952  I. T. WEDIN  2,603,876
AMPLIFYING COMPARATOR WITH DIFFERENTIAL SCREW
Filed April 27, 1950  3 Sheets-Sheet 3

INVENTOR.
IVAR T. WEDIN.
BY Robert A. Sloman
ATTORNEY.

Patented July 22, 1952

2,603,876

UNITED STATES PATENT OFFICE 2,603,876

AMPLIFYING COMPARATOR WITH DIFFERENTIAL SCREW

Ivar T. Wedin, Farmington, Mich., assignor of one-half to Gertrude Wedin, Farmington, Mich.

Application April 27, 1950, Serial No. 158,523

5 Claims. (Cl. 33—147)

This invention relates to gages and more particularly to an amplifier gage construction.

It is the object of the present gage construction to provide an extremely accurate measuring device, which will give readings if desired within a millionth of an inch.

It is the further object of this invention to provide an extremely simplified amplifier gage construction which is durable, and inexpensive to manufacture.

These and other objects will be seen from the following specification and claims in conjunction with the appended drawings in which:

Figure 1:
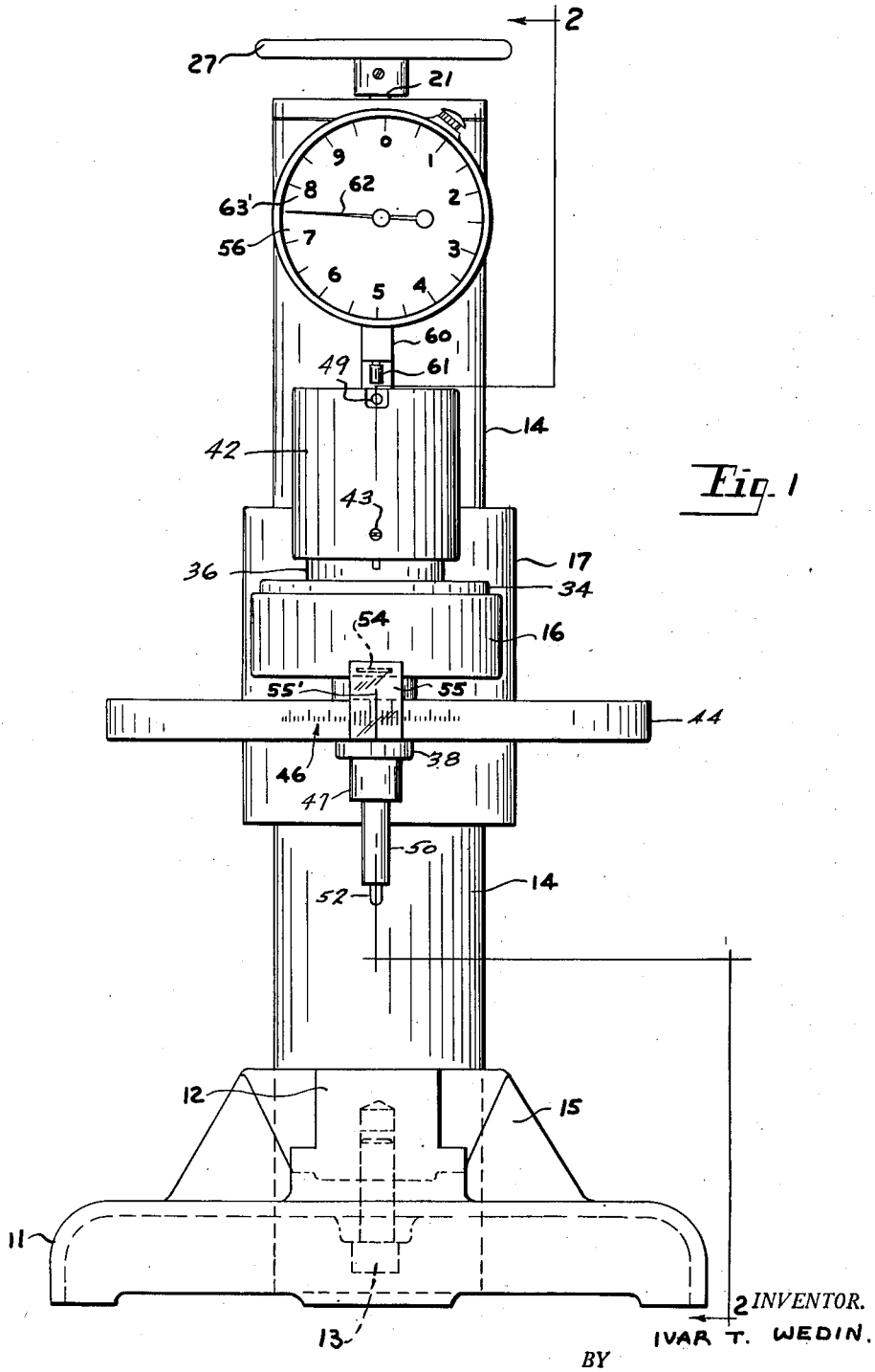
Fig. 1 is a front-elevational view of the present amplifier gage.

It will be understood that the above drawings illustrate merely a preferred embodiment of the invention and that other embodiments are contemplated within the scope of the claims hereafter set out.

Referring to the drawings the amplifier gage includes the hollow base 11 upon which is mounted the bottom anvil 12, and which is secured to said base by the screw 13 which projects upwardly thereinto.

Upon the opposite end of said base and through its rear portion 15 upwardly projects the tubular standard 14 having a suitable cap 15'. Laterally extending bracket 16 with tubular supporting collar 17 is adjustably mounted upon said standard with said collar fitting around the same, and including the bifurcations 18 whereby said bracket may be secured at any desired adjusted position upon said standard by means of the screw 19 and the knob 20 therefor.

By this construction the bracket 16 may be manually raised and lowered and then secured in the desired position by said knob and screw. On the other hand the bracket 16 may be raised and lowered by manual rotation of the hand wheel 27 secured upon the upper end of the axial shaft 21 supported within standard 14.

Said shaft includes a central threaded portion 22, the lower end of said shaft extending into disc 23 within said standard. The upper end of shaft 21 extends through the disc 24 and carries a bearing plate 25, suitable ball bearings 26 being interposed between said plate and said disc.

Threaded nut 28 is mounted upon threaded shaft 22, and transverse shaft 29 is joined at one end to said nut with its opposite end projecting through the longitudinal slot 30 of standard 14 and terminating within the annular slot 31 formed upon the interior of bracket element 17. By this construction rotation of the wheel 27 will cause vertical adjustments of the nut 28 as well as the collar 17 which is secured thereto by the shaft 29.

Figure 2:
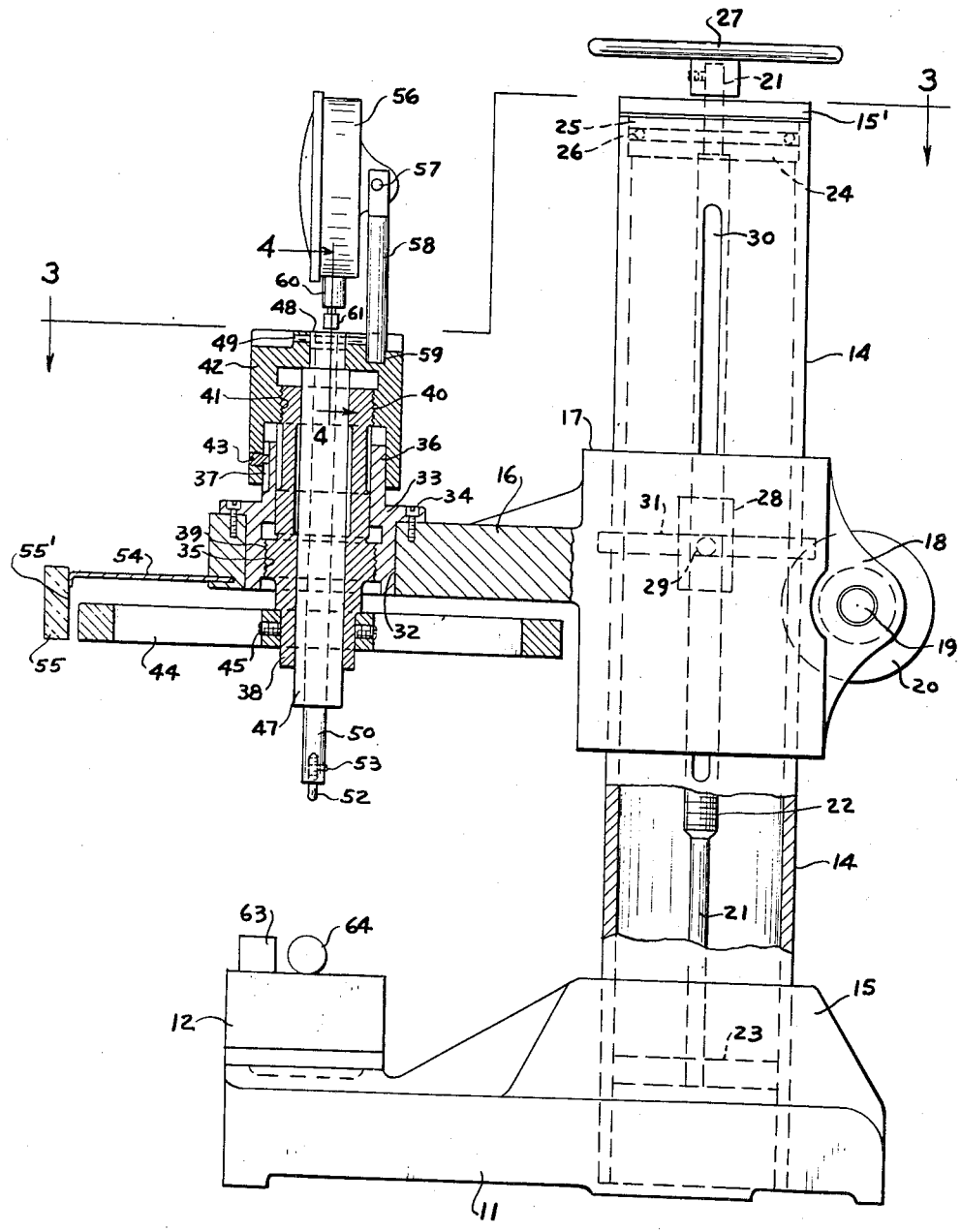
Fig. 2 is an elevational section taken on line 2—2 of Fig. 1.
Figure 3:
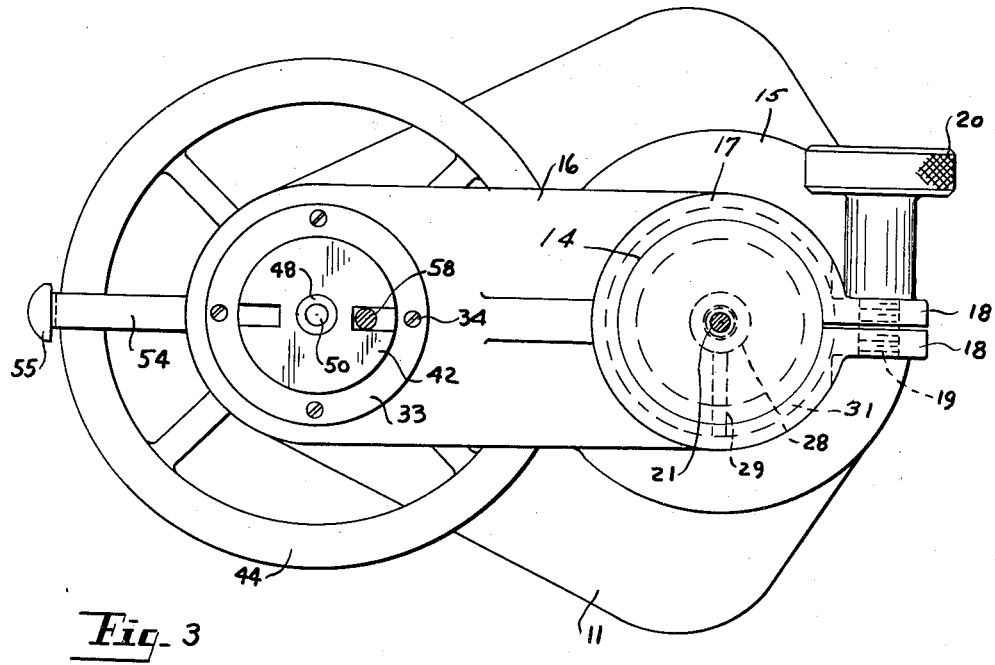
Fig. 3 is a plan section taken on line 3—3 of Fig. 2.
Figure 4:
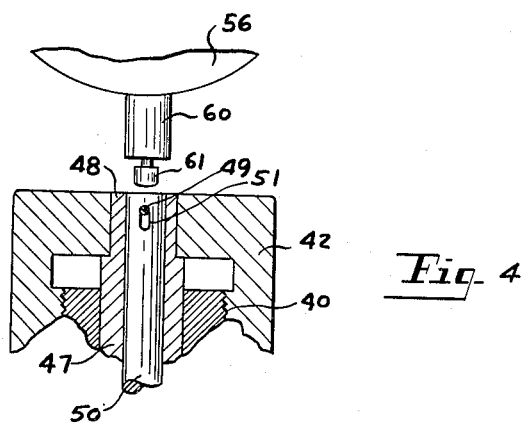
Fig. 4 is a fragmentary elevational section taken on line 4—4 of Fig. 2.

Referring to Fig. 2 there is provided a transverse bore 32 adjacent the outer end of bracket 16 within which is positioned the guide bushing 33, secured to said bracket by the screws 34.

Bushing 33 is interiorly threaded at 35 by threads of a predetermined pitch such as a 40 pitch or 40 threads to the inch, for illustration. The upper cylindrical portion 36 of said bushing has an elongated slot 37 therein to cooperatively receive the inner end of the set screw 43 hereafter described.

Elevating screw 38 is positioned through said bracket and bushing and includes a threaded portion 39 of the same pitch i. e. a 40 pitch, for example, which threadedly engages bushing threads 35. Spaced from threads 39 there is also provided within the elevating screw 38 the second threaded portion 40, which are of a predetermined pitch which differs from the pitch of the threads 39, said latter threads 40 being of a 50 pitch for the purpose of illustration. Furthermore the hollow top anvil 42 is interiorly threaded at 41 with the threads of the same pitch whereby said anvil threadedly engages the upper end of the elevating screw and is adapted for vertical movements with respect to said screw upon rotation of said screw by the hand wheel in the manner hereafter described.

The set screw 43 extends transversely through the lower end of top anvil 42 and is cooperatively engaged within slot 37 in bushing 33 to thereby prevent rotation of said top anvil, but at the same time permit vertical movements thereof with respect to said screw 38 upon rotation thereof.

The transverse hand wheel 44 is secured preferably to the lower end of the elevating screw 38 as by the set screws 45. By employing a relatively large hand wheel having a 10 inch diameter for example, it is clear that one rotation of said hand wheel through 360° will cause a peripheral movement of approximately 31.4 inches. As shown in Fig. 1 the outer peripheral wall of said hand wheel is suitably calibrated at 46.

The guide tube 47 slidably extends through elevating screw 38 and its upper reduced end 48 is secured to top anvil 42 by the transverse pin 49 for vertical movements in unison upon rotation of the screw 38. There is provided a top anvil stem 50 which is also joined to said top anvil 42 by the transverse pin 49, there being provided an elongated slot 51 through the upper end of said stem to provide a floating relation between said stem and said top anvil.

Contact point 52 is threaded within the lower end of the stem 50 and is secured therein by the set screw 53, said contact point being adapted for cooperative engagement with the work-piece 64 which as shown in Fig. 2 rests upon bottom anvil 12.

Horizontal arm 54 projects outwardly from the outer end of the bracket 16 and carries upon its outer end the optical glass 55 which includes vertical hair-line 55', said glass being arranged outwardly of the wheel 44 adjacent its calibrations 46, to thereby ascertain the extent that the wheel 44 is rotated, being normally a fraction of a complete revolution.

In making the initial setting of the gage, before a gaging operation it is necessary to attain a zero reading with respect to a precision gage block which is of a predetermined exact dimension, as for instance a one-half inch gage block, in the case where a cylindrical object is specified to have a diameter of one-half inch.

Initially the bracket 17 is lowered manually until the contact 52 is close to the gage block 63 shown in Fig. 2, said gage being moved to the central position occupied by the workpiece 64. Then the hand wheel 44 is rotated manually causing a downward vertical movement of the stem 50 until contact 52 engages the top surface of gage block 63. When this is done, it is then necessary to take a reading of the calibrations 46, which would be the zero reading; after which the hand wheel 44 would be turned slightly in the opposite direction to elevate the contact point 52 sufficiently to permit withdrawal of the gage block and insertion of the work-piece 64 to the position shown in Fig. 2.

Thereafter the hand wheel 44 is rotated in the opposite direction causing downward movement of the contact 52 until the same engages the top of the work-piece 64, after which another reading is taken of the calibrations 46. The difference between the two readings of the calibrations 46, if any, will indicate the variance of dimension of the work-piece from the gage block 63.

In attaining great accuracy, as is the case with the present amplifier gage, there must be an assurance that the contact 52 engages the gage block as well as the work-piece 64 at the same predetermined pressure. This is attained by employing the floating mounting for the upper end of the stem 50 whereby the pressure of engagement of contact 52 is transmitted to the upper end of the stem 50 and thence to the indicator 56.

Said indicator has a bifurcated portion upon its rear portion permitting a swivel mounting at 57 upon the upper end of the support 58, the lower end of said support being secured at 59 to the top anvil 42.

Actuator 61 under a predetermined spring tension of one pound, for instance, projects through the guide 60 and is adapted for cooperative engagement with the upper end of stem 50 when contact 52 is in engagement with the gage block 63 or the work-piece 64. As shown in Fig. 1, indicator 56 is calibrated at 63' and the needle 62 moves with respect to said calibrations responsive to movement of the contactor 61.

In operation the contact 52 will, when engaging the surface of the gage 63, give a reading through the needle 62, and with the gage removed and the work-piece substituted, the same pressure will be attained between the contact 52 and the work-piece when the needle 62 again gives the same reading.

In operation it will be seen that counter-clockwise rotation of the hand wheel 44 will cause the elevating screw 38 to rise, carrying with it top anvil 42 as well as the top anvil stem 50. At the same time, however, counter-clockwise rotation of said screw will effect a non-rotative downward movement of the top anvil 42. As the threads 40 and 39 are of different pitch, it is apparent that the longitudinal movement of the stem 50 due to a rotary movement of the hand wheel 44 throughout 360°, will equal in inches the difference between the leads of said threads.

For example in the preferred embodiment above described for illustration the lower thread was a 40 pitch thread, i. e. thread 39, while the upper thread 40 was a 50 pitch thread. Therefore one 360° revolution counter-clockwise of hand wheel 44 and the screw 38 would cause a longitudinal upward movement of .025 inch. At the same time this same rotation of the screw 38 would cause a downward longitudinal movement of the top anvil 42 a distance of .020 inch, with the result that the total upward movement of the stem 50 for one complete revolution of the wheel 44 would be only .005 inch. On the other hand a 360° rotation of hand wheel 44 in a clockwise direction would effect a total longitudinal downward movement of the contact 52 equal to .005 inch.

By employing a hand wheel having a ten inch diameter, it is seen that a 360° rotation of the same will cover approximately 31.4 inches, and all of this rotation will only produce a longitudinal movement of .005 inch of the contact 52. It will be apparent from the following schedule that very minute longitudinal distances may be measured upon fractional movements of the hand wheel 44:

| Longitudinal Feed Movement | Circumference of Hand Wheel |
| --- | --- |
| Inch | |
| .005 | 31.4 inches (360°). |
| .001 | $\frac{31.4}{5}$ = 6.280 inches. |
| .0001 | = .628 inch. |
| .00001 | = .0628 inch ($\frac{1}{16}''$) approx. |
| .000001 (millionth) | = .00628 inch. |

Thus it is apparent by properly arranging the calibrations 46 upon the hand wheel 44, a movement of said hand wheel .00628" in one direction or the other past the hair-line 55' of the optical lens 55, would cause a longitudinal gaging movement of contact 52 in one direction or the other, one-millionth of an inch.

To attain extreme accuracy in an amplifier gage of this type it is essential that the threads 35, 39, 40 and 41 be precision ground. It is possible by using a calibrated lead screw with zero error that very accurate threads may be ground where the total error over an inch of thread will not exceed .0001 inch. In other words the error for one revolution on a 40 pitch thread would be approximate 2½ millionths of an inch per total revolution.

It is contemplated that any suitable pitch of thread be employed for the two threads upon the elevating screw 38, however it is essential that the two pitches be different to thereby obtain a differential movement of the stem 50 upon a rotary movement of said screw. For instance it might be desirable that one of the threads have a pitch or lead of .025 inch and the other thread would have a pitch or lead of .026 inch. This would mean for one complete revolution of hand wheel 44 the total gaging movement of the contact 52 would be only .001 inch, and this corresponds to a circumference of rotation of approximately 31.4 inches. By rotating said hand wheel through a circumference of 3.14 inches the gaging movement would be .0001 inch, similarly, a rotary movement of .314 inch would cause a gaging movement of .00001 inch, and finally a rotary movement of .0314 inch which is visible, being approximately $\frac{1}{32}$ of an inch, would cause a gage movement of contact 52 equal to .000001 inch, i. e. one-millionth of an inch.

Having described my invention, reference should now be had to the claims which follow for determining the scope thereof.

I claim:

1. An amplifier gauge comprising a base including a work-piece supporting bottom anvil, an upright standard on said base, an outwardly projecting bracket adjustably mounted upon said standard, a hollow rotatable elevating screw having a thread of predetermined pitch threaded through said bracket, a second thread on said screw spaced from said first thread and having a different predetermined pitch, a top anvil mounted upon and in threaded engagement with said second thread, guide means loosely interconnecting said bracket and top anvil to prevent rotation thereof, a stem joined to and depending from said top anvil with its lower end cooperatively engageable with a work-piece upon said bottom anvil, whereby rotation of said screw will effect a differential longitudinal movement of said stem, and a tubular stem guide joined to and depending from said top anvil and slidable through said screw, said stem extending loosely through said stem guide, and a handwheel mounted upon said screw, its peripheral surface having a pre-determined calibration thereon to visibly indicate the variation in height of a work-piece with respect to a gage block initially contacted by said stem.

2. An amplifier gauge comprising a base including a work-piece supporting bottom anvil, an upright standard on said base, an outwardly projecting bracket adjustably mounted upon said standard, an upright hollow rotatable elevating screw having a thread of predetermined pitch threaded through said bracket, a second thread on said screw spaced above said first thread and having a different predetermined pitch, a top anvil mounted upon and in threaded engagement with said second thread, guide means loosely interconnecting said bracket and top anvil to prevent rotation thereof, a stem joined to and depending from said top anvil with its lower end cooperatively engageable with a work-piece upon said bottom anvil, whereby rotation of said screw will effect a differential longitudinal movement of said stem, and a tubular stem guide joined to and depending from said top anvil and slidable through said screw, said stem having a transverse slot at its upper end, and a pin extending through said top anvil, said guide, and through said slot providing a floating connection with said top anvil permitting relative movement therebetween, said stem extending loosely through said stem guide, and a handwheel mounted upon said screw, its peripheral surface having a pre-determined calibration thereon to visibly indicate the variation in height of a work-piece with respect to a gage block initially contacted by said stem.

3. An amplifier gauge comprising a base including a work-piece supporting bottom anvil, an upright standard on said base, an outwardly projecting bracket adjustably mounted upon said standard, a hollow rotatable elevating screw having a thread of predetermined pitch threaded through said bracket, a second thread on said screw spaced from said first thread and having a different predetermined pitch, a top anvil mounted upon and in threaded engagement with said second thread, guide means loosely interconnecting said bracket and top anvil to prevent rotation thereof, a stem joined to and depending from said top anvil with its lower end cooperatively engageable with a work-piece upon said bottom anvil, whereby rotation of said screw will effect a differential longitudinal movement of said stem, a tubular stem guide joined to and depending from said top anvil and slidable through said screw, said stem having a transverse slot at its upper end, and a pin extending through said top anvil, said guide, and through said slot providing a floating connection with said top anvil permitting relative movement therebetween, and a pressure indicator supported upon said top anvil and having a spring loaded moveable element cooperatively engageable with said stem to indicate a predetermined gauging pressure between the lower end of said stem and said work-piece, said stem extending loosely through said stem guide, and a handwheel mounted upon said screw, its peripheral surface having a pre-determined calibration thereon to visibly indicate the variation in height of a work-piece with respect to a gage block initially contacted by said stem.

4. An amplifier gauge comprising a base including a work-piece supporting bottom anvil, an upright standard on said base, an outwardly projecting bracket adjustably mounted upon said standard, a hollow rotatable elevating screw having a thread of predetermined pitch threaded through said bracket, a second thread on said screw spaced from said first thread and having a different predetermined pitch, a top anvil mounted upon and in threaded engagement with said second thread, guide means loosely interconnecting said bracket and top anvil to prevent rotation thereof, a stem joined to and depending from said top anvil and extending longitudinally through said screw with its lower end cooperatively engageable with a work-piece upon said bottom anvil, whereby rotation of said screw will effect a differential longitudinal movement of said stem, and a hand wheel mounted upon said screw, its peripheral surface having a predetermined calibration thereon to visibly indicate the variation in height of a work piece with respect to a gage block initially contacted by said stem.

5. An amplifier gauge comprising a base including a work-piece supporting bottom anvil, an upright standard on said base, an outwardly projecting bracket adjustably mounted upon said standard, an upright bushing extending through said bracket and secured thereto, and having an upright longitudinal slot formed therein, a hollow rotatable elevating screw having a thread of predetermined pitch threaded through said bushing, a second thread upon said screw spaced above the first thread and having a different predetermined pitch, a top anvil mounted upon and in threaded engagement with said second thread, a transverse set screw secured to and projecting through said top anvil and into said slot to prevent rotation of said top anvil, and a stem joined to and depending from said top anvil and extending longitudinally through said screw with its lower end cooperatively engageable with a work-piece upon said bottom anvil, whereby rotation of said screw will effect a differential longitudinal movement of said stem, and a hand wheel mounted upon said screw, its peripheral surface having a pre-determined calibration thereon to visibly indicate the variation in height of a workpiece with respect to a gage block initially contacted by said stem.

IVAR T. WEDIN.

REFERENCES CITED

The following references are of record in the file of this patent:

UNITED STATES PATENTS

| Number | Name | Date |
| --- | --- | --- |
| 902,492 | Jaques | Oct. 27, 1908 |
| 1,900,231 | Ede | Mar. 7, 1933 |
| 2,083,759 | Temple | June 15, 1937 |
| 2,252,146 | Walsh | Aug. 12, 1941 |
| 2,481,078 | Burdwood | Sept. 6, 1949 |

FOREIGN PATENTS

| Number | Country | Date |
| --- | --- | --- |
| 8,798 | Great Britain | 1906 |
| 179,910 | Great Britain | July 11, 1923 |
| 247,257 | Switzerland | Nov. 17, 1947 |
| 552,589 | Great Britain | Apr. 15, 1943 |

OTHER REFERENCES

American Machinist, January 1, 1948, page 36.